(12) United States Patent
Huang et al.

(10) Patent No.: US 8,675,716 B2
(45) Date of Patent: Mar. 18, 2014

(54) TRANSCEIVER DEVICE AND RELATED METHOD THEREOF

(75) Inventors: Liang-wei Huang, Hsinchu (TW);
Chun-Hung Liu, Taipei County (TW);
Shieh-Hsing Kuo, Hsinchu (TW);
Wen-Jen Cho, Taipei County (TW)

(73) Assignee: Realtek Semiconductor Corp., Hsinchu (TW)

( * ) Notice: Subject to any disclaimer, the term of this patent is extended or adjusted under 35 U.S.C. 154(b) by 45 days.

(21) Appl. No.: 13/402,286

(22) Filed: Feb. 22, 2012

(65) Prior Publication Data

US 2012/0213256 A1 Aug. 23, 2012

(30) Foreign Application Priority Data

Feb. 23, 2011 (TW) .............................. 100105911 A

(51) Int. Cl.
*H04L 5/16* (2006.01)

(52) U.S. Cl.
USPC ........................................................ 375/219

(58) Field of Classification Search
USPC .......... 375/219, 267, 299, 345; 455/133, 136, 455/138; 370/338, 474
See application file for complete search history.

(56) References Cited

U.S. PATENT DOCUMENTS

| 8,054,739 | B2 * | 11/2011 | Nakao et al. .................. 370/203 |
| 2002/0122503 | A1 | 9/2002 | Agazzi | |
| 2005/0215211 | A1 * | 9/2005 | Young et al. .................. 455/136 |
| 2005/0286562 | A1 | 12/2005 | Nakao et al. | |

* cited by examiner

*Primary Examiner* — Khai Tran
(74) *Attorney, Agent, or Firm* — Muncy, Geissler, Olds & Lowe, P.C.

(57) ABSTRACT

A transceiver device includes a transmitting unit, a receiving unit, and a detection unit. The transmitting unit transmits a first packet; the receiving unit receives a second packet and at least one receiving parameter; the detection unit is coupled to the transmitting unit and the receiving unit, and detects the first and the second packets to adjust the receiving parameter. When the detection unit detects that the first and the second packets are substantially the same, the detection unit pauses adjusting the receiving parameter.

17 Claims, 11 Drawing Sheets

| packet / time | t=k-2 | t=k |
|---|---|---|
| packet P1 | 11100000 | 11110000 |
| packet P2 | 00001111 | 00011110 |

FIG. 4C

| time \ packet | t=k-2 | t=k |
|---|---|---|
| packet P1 | 11100000 | 11000000 |
| packet P2 | 00001111 | 00000111 |

FIG. 4E

TRANSCEIVER DEVICE AND RELATED METHOD THEREOF

BACKGROUND OF THE INVENTION (a) Field of the Invention

The invention relates to a transceiver device, particularly to a transceiver device to lower interference that causes an packet error in a communication system.

(b) Description of the Related Art

In a traditional Fast Ethernet system, although it is a full-duplex system, transmitting and receiving (Tx/Rx) are divided into two transmission paths for the same receiving end and they do not interfere with each other. Therefore, when two ends are not under the state of transmitting packets, the same idle sequence will be outputted. Since a fast Ethernet system comprises two different transmission paths, there is no influence even when the same signals are outputted.

At first, in a Fast Ethernet environment, since the starting point in the original design is transmission of two transmission paths (each is unidirectional), the same MLT-3 idle sequence is outputted when two ends are not under the state of transmitting packets and the same signals are outputted by the two ends within a short period of time because the frequencies of the two ends are different. Such a situation happens periodically and the occurrence period of the situation depends on frequency drifting of the two ends.

The high definition multimedia interface (HDMI) application uses a transmission path to execute bidirectional transmission, receiving not only signals from two ends but also echo signals from their own output. When the signals outputted by the two ends are the same, that is, the signal from the other end is the same as the echo signal, the receiving end becomes having a better signal-to-noise ratio because of increased amount of received energy to make the convergence parameter of the receiving end converged to an incorrect solution. If the other end is executing the packet transmission at the time, it will result in an packet error due to the incorrect convergence parameter.

Besides, in a Gigabit Ethernet system, transmitting and receiving should be executed in the same transmission path but the MLT-3 idle sequence outputted by the two ends are different because the above problem is considered during establishing the specification and thus the signals are not mixed up.

However, in the specification of HDMI 1.4 using Fast Ethernet specification, due to limitation of transmission media, transmitting and receiving are set to execute transmission in the same transmission path. Because Fast Ethernet specification originally has no application executing transmission in the same transmission path, the above mentioned situation are not considered and packet errors happen so that the system can fail easily.

BRIEF SUMMARY OF THE INVENTION

One object of the invention is to provide a transceiver device and a parameter adjustment method to lower the probability of packet error occurrence under the idle sequence situation.

One embodiment of the invention provides a transceiver device, comprising a transmitting unit, a receiving unit, and a detection unit. The transmitting unit transmits a first packet and the receiving unit receives a second packet and at least one receiving parameter. The detection unit is coupled to the transmitting unit and the receiving unit and detects the first and the second packets to adjust the receiving parameter. When the detection unit detects that the first and the second packets are substantially the same, the detection unit pauses adjusting the receiving parameter.

Furthermore, one embodiment of the invention provides a parameter adjustment method, comprising: transmitting a first packet; receiving a second packet and at least one receiving parameter; and detecting the first packet and the second packet to adjust the receiving parameter; wherein adjusting the receiving parameter pauses when the first and the second packets are substantially the same.

Other objects and advantages of the invention can be better understood from the technical characteristics disclosed by the invention. In order to clarify the above mentioned and other objects and advantages of the invention, examples accompanying with figures are provided and described in details in the following.

BRIEF DESCRIPTION OF THE DRAWINGS

FIG. 4C shows a schematic diagram illustrating the packet P1 and the packet P2 close to each other according to one embodiment of the invention.

FIG. 4E shows a schematic diagram illustrating the packet P1 and the packet P2 away from each other according to one embodiment of the invention.

DETAILED DESCRIPTION OF THE INVENTION

The transceiver 100 of the invention transmits a packet through a transmission medium and transmits an idle sequence to maintain communication with a remote end when not transmitting any packet.

Figure 1:
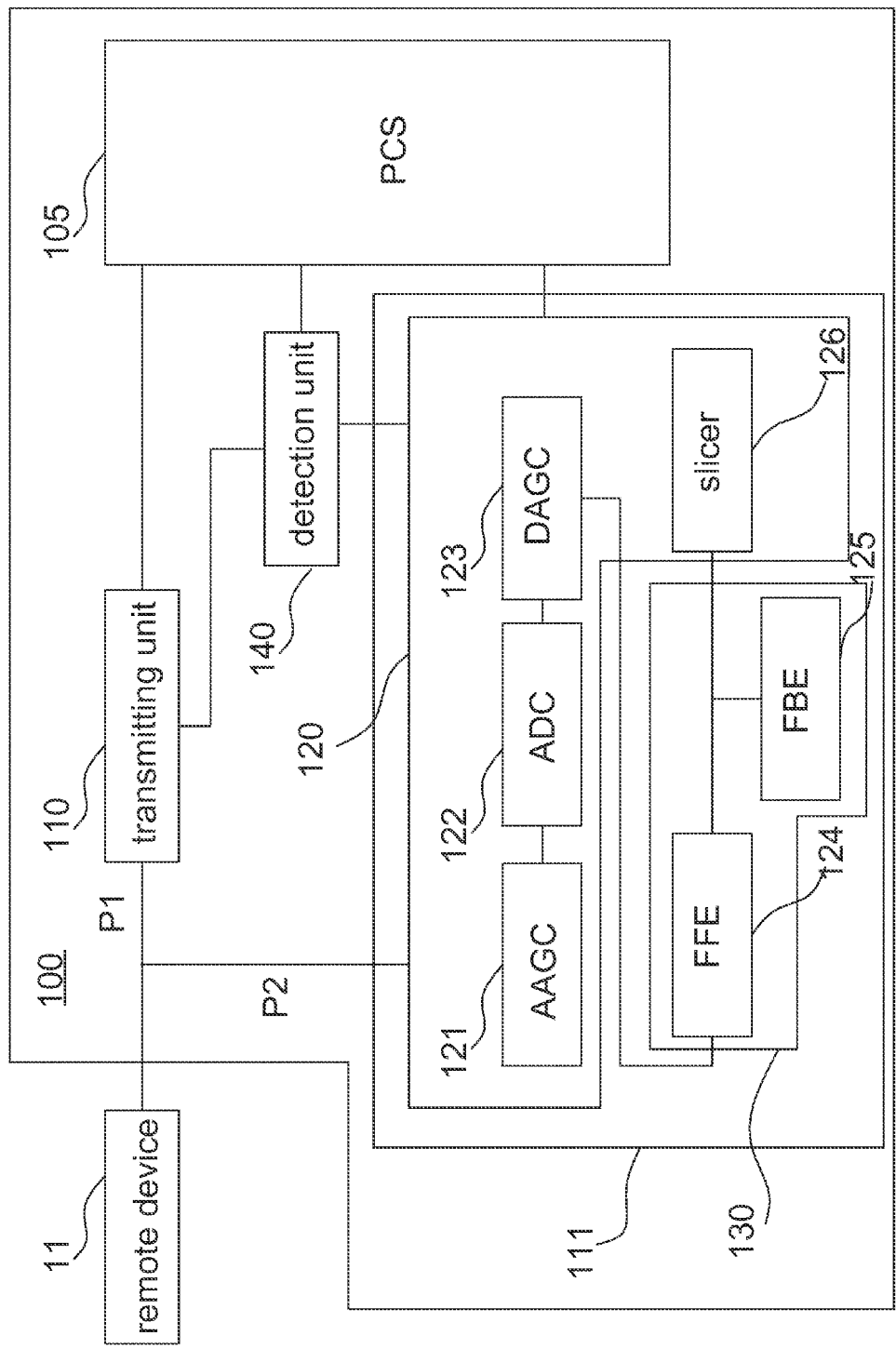
FIG. 1 shows a schematic diagram illustrating a transceiver device according to one embodiment of the invention.

Please refer to FIG. 1. FIG. 1 shows a schematic diagram illustrating the transceiver device 100 according to one embodiment of the invention. The transceiver device 100 comprises a transmitting unit 110, a receiving unit 111, and a detection unit 140.

The receiving unit 111 comprises a receiver 120 and an equalizer 130. The transmitting unit 110 transmits a packet P1 and the receiving unit 111 receives a packet P2. The receiving unit 111 receives the packet P2 according to at least one receiving parameter. The detection unit detects the packets P1 and P2 to adjust the receiving parameter.

In one embodiment of the invention, the transceiver 100 further comprises a physical coding sub-layer (PCS) 105. The physical coding sub-layer layer 105 is coupled to the transmitting unit 110 and the receiving unit 111 and determines whether the transmitting unit 110 transmits the packet P1 or not and/or whether the receiving unit 111 receives the packet P2 or not so as to determine whether the receiving parameter is converged or not.

In this embodiment, a remote device transmits the packet P2 and the transceiver 100 transmits the packet P1. The remote device 11 and the transceiver 100 execute signal transmission and data exchange through the packets P1 and P2.

Besides, in this embodiment, the receiver 120 comprises an analog automatic gain control (AAGC) 121, an analog-to-digital converter (ADC) 122, a digital automatic gain control (DAGC) 123 and a slicer 126.

The equalizer 130 comprises a feed forward equalization (FFE) 124 and a feedback equalization (FBE) 125.

When the receiver 120 receives the packet P2, the analog automatic gain control (AAGC) 121 adjusts the gain of the packet P2, the analog-to-digital Converter (ADC) 122 converts the adjusted signal into a digital signal and the digital automatic gain control (DAGC) 123 adjusts the gain of the digital signal to output. The feed forward equalization (FFE) 124 receives the output of the digital automatic gain control (DAGC) 123 to execute feed forward equalization to generate a feed forward signal. The slicer 126 recognizes an equalization signal according to the feed forward signal and the output from the feedback equalization (FBE) 125 to supply to the physical coding sub-layer layer 105 for conversion.

The feedback equalization (FBE) 125 executes feedback equalization based on the equalization signal to thereby generate an output signal. In one embodiment, feed forward equalization and feedback equalization are multiple order operations.

It should be noted that the detection unit 140 according to one embodiment of the invention detects the packets P1 and P2 to adjust the receiving parameter. The receiving parameter comprises at least one of an analog automatic gain control (AAGC) 121 parameter, an analog-to-digital converter (ADC) 122 parameter, a digital automatic gain control (DAGC) 123 parameter, a slicer 126 parameter, a feed forward equalization (FFE) 124 parameter, and a feedback equalization (FBE) 125 parameter so as to maintain the connection quality between the transceiver 100 and the remote device.

In light of the problem in the prior art, the reason of causing packet errors is that the transceiver 100 and the remote device 11 transmit the same data. For example, when the transceiver 100 and the remote device 11 do not transmit any data packet, the transceiver 100 and the remote device 11 output the same idle sequence. In other words, since the packet P1 transmitted by the transceiver 100 is substantially equal to the packet P2 transmitted by the remote device 11, the receiving parameter of the transceiver 100 is converged incorrectly. Thus, in this embodiment, the detection unit 140 detects the packets P1 and P2 to assure that convergence of the receiving parameter of the transceiver 100 is executed at the same time when either the transceiver 100 or the remote device 11 or both do not transmit an idle sequence.

On the contrary, if the transceiver 100 and the remote device 11 both transmit an idle sequence, the synchronization function becomes an update pause. An update pause indicates the converged receiving parameter temporarily keeps unchanged.

In this embodiment, when the transceiver 100 and the remote device 11 both transmit an idle sequence, convergence of the parameters of the analog automatic gain control 121, the digital automatic gain control 123, the feed forward equalization 124 and the feedback equalization 125 is paused.

Figure 2:
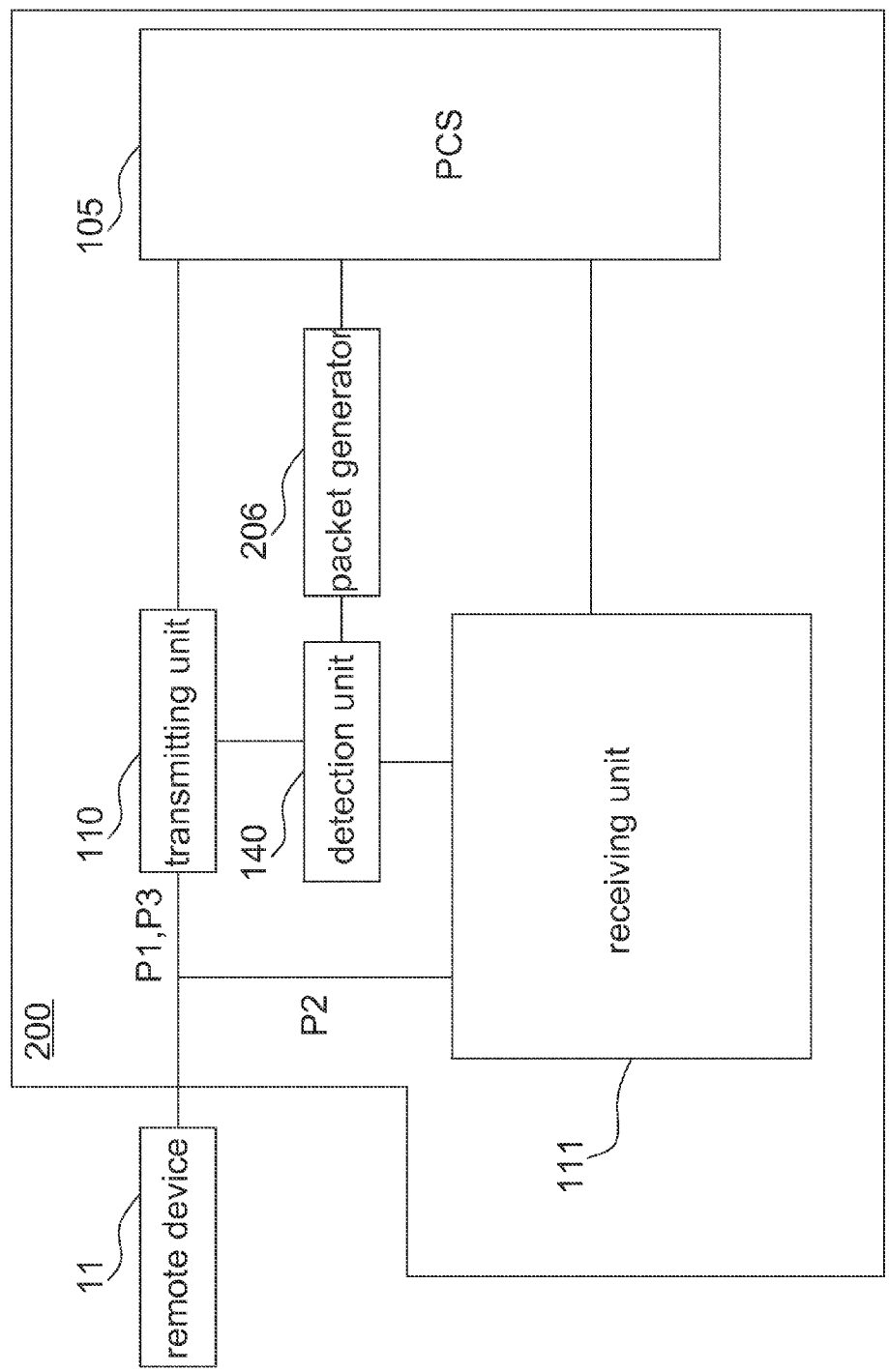
FIG. 2 shows a schematic diagram illustrating a transceiver device according to one embodiment of the invention.

Please refer to FIG. 2. FIG. 2 shows a schematic diagram illustrating a transceiver device 200 according to one embodiment of the invention. The difference of the transceiver device 200 and the transceiver device 100 is that the transceiver device 200 further comprises a packet generator 206 coupled to the detection unit 140 and the physical coding sub-layer 105, separately. The equalizer included in the transceiver device 200 can be implemented by any current or future to-be-developed equalization device or element.

In this embodiment, when the detection unit 140 detects that the packet P1 is an idle sequence, the detection unit 140 makes the packet generator 206 generate an indicator signal to the physical coding sub-layer 105 within a preset period so that the physical coding sub-layer 105 generates a packet P3 within the preset period to the transmitting unit 110. The transmitting unit 110 transmits the packet P3. The packet P3 is used to replace the packet P1. In this embodiment, the packet P3 is a garbage packet.

Since the packet P1 is replaced by the packet P3, the transmitted packet at the time is not an idle sequence and the transceiver 200 can continue the normal operation even if the packet P2 is an idle sequence. The synchronization function does not need to become an update pause. In other words, no "update pause" indicates that the transceiver 200 can continue adjusting the receiving parameter.

In other words, this embodiment can avoid the packets P1 and P2 transmitted by the transceiver 200 and the remote device 11, respectively, from being idle sequences at the same time. Thus, when the packet P1 is an idle sequence, the transceiver 200 uses the packet generator 206 to generate the packet P3 with the preset period and transmits the packet P3 instead of the packet P1. Therefore, the situation that the transceiver 200 and the remote device 11 both transmit an idle sequence can be avoided.

Figure 3:
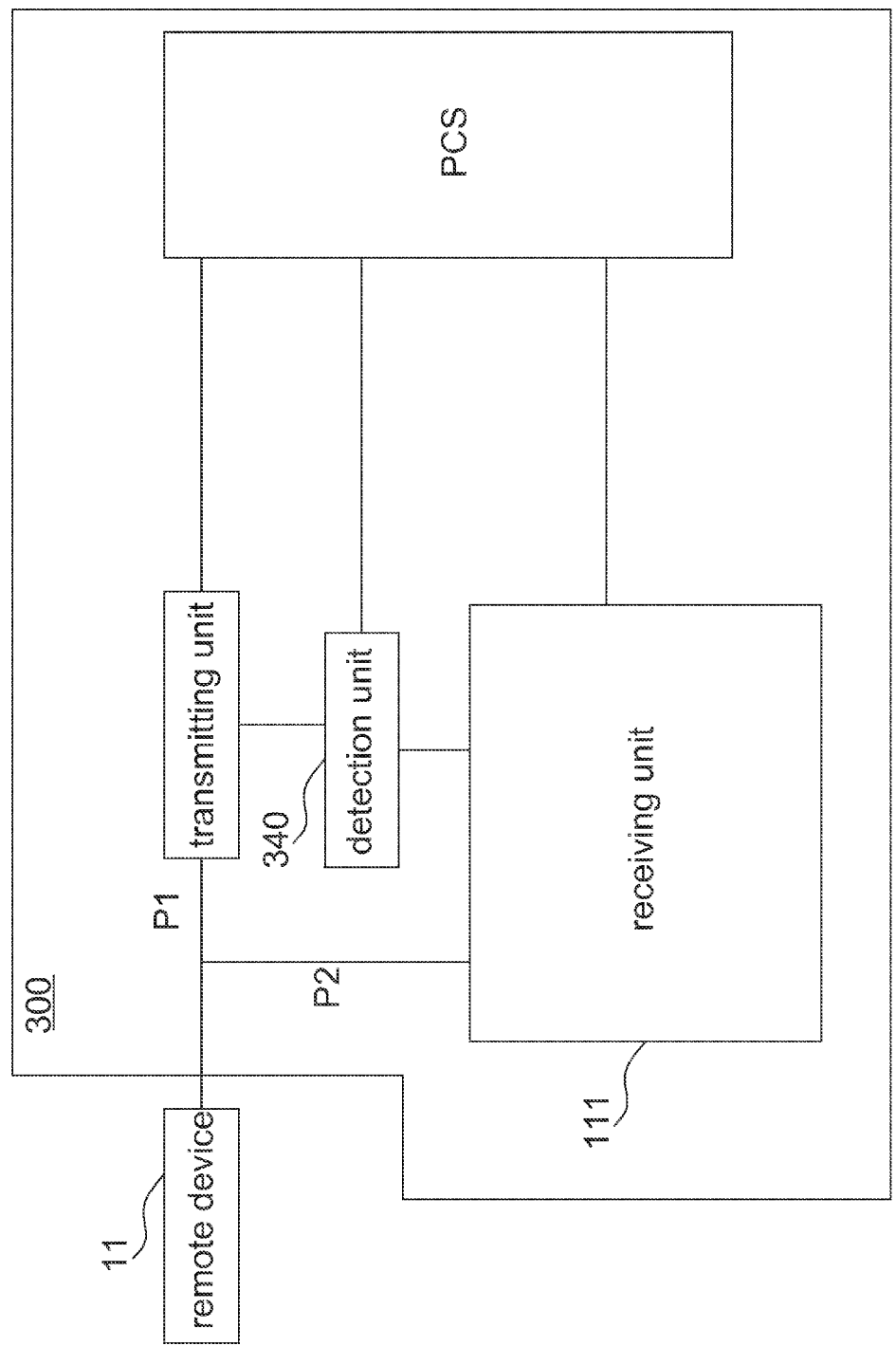
FIG. 3 shows a schematic diagram illustrating a transceiver device according to one embodiment of the invention.

Then, please refer to FIG. 3. FIG. 3 shows a schematic diagram illustrating a transceiver device 300 according to one embodiment of the invention. The difference of the transceiver device 300 and the transceiver device 100 is that the detection unit 340 is coupled to the receiving unit 111. When detecting that the packets P1 and P2 are idle sequences, the detection unit 340 calculates a signal-to-noise ratio (SNR) of the signal according to the packet P2. In one embodiment, when the SNR is larger than a preset value, the detection unit 340 temporarily pauses adjusting the receiving parameter.

When the transceiver device 300 and the transceiver device 100 both transmit the same idle sequence, the SNR suddenly increases and is larger than the preset value. The SNR becomes larger because of the bounced echo signal when the signals outputted by the two ends but is not really improved.

Thus, if the SNR is larger than the preset value at the time, the detection unit 340 of the transceiver device 300 temporarily pauses adjusting the receiving parameter. The detection unit 340 does not continue adjusting the receiving parameter until the SNR becomes normal. Therefore, the phenomenon caused by the bounced echo signal when the signals outputted by the two ends can be avoided. Thus, incorrect convergence of the receiving parameter can be avoided.

Figure 4A:
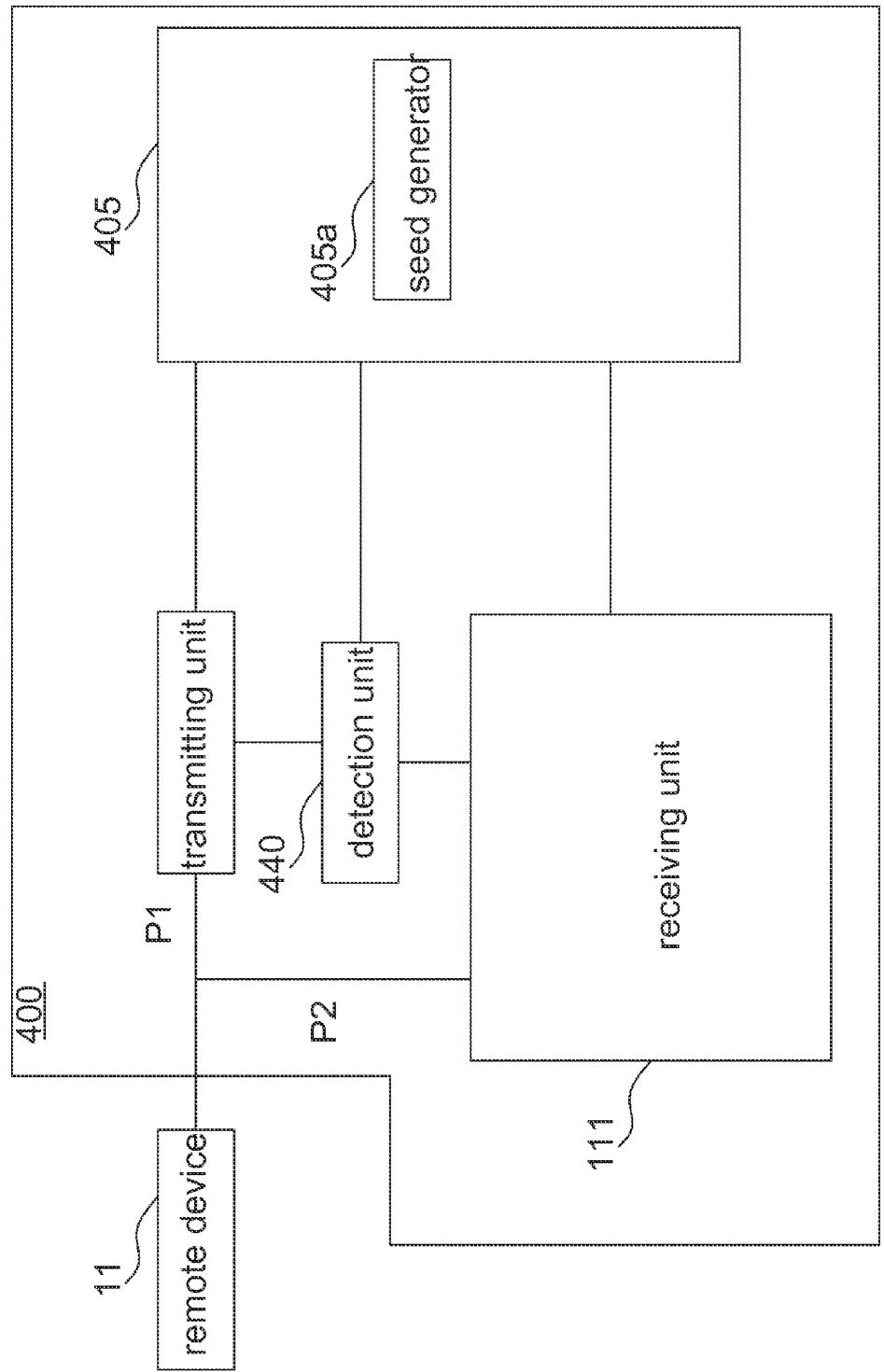
FIG. 4A shows a schematic diagram illustrating a transceiver device according to one embodiment of the invention.
Figure 4B:
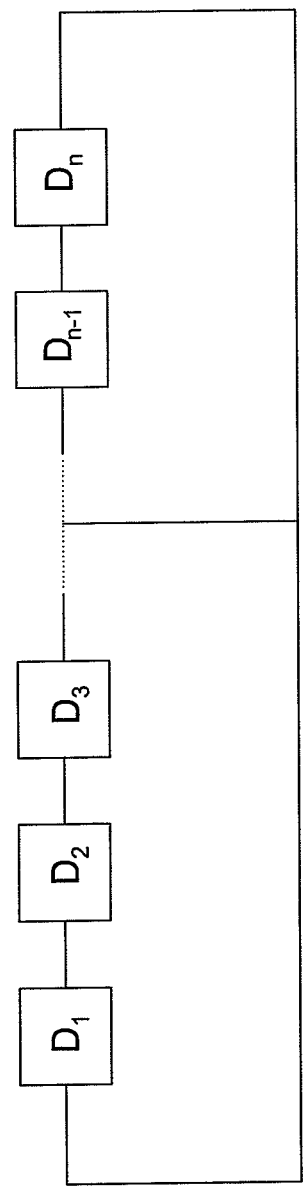
FIG. 4B shows a schematic diagram illustrating a seed generator according to one embodiment of the invention.

Please simultaneously refer to FIGS. 4A and 4B. FIG. 4A shows a schematic diagram illustrating a transceiver device 400 according to one embodiment of the invention. FIG. 4B shows a schematic diagram illustrating a seed generator according to one embodiment of the invention.

The difference of the transceiver device 400 and the transceiver device 100 is that the physical coding sub-layer 405 further comprises a seed generator 405a coupled to the detection unit 440. The seed generator 405a generates a plurality of seeds in the idle sequence.

In one embodiment, the seed generator 405a can be implemented by a shift register. The seed generator 405a comprises a plurality of registers D1~Dn to generate seeds, as shown in FIG. 4B.

After the transceiver device 400 is connected, the receiving parameters are all converged and under the condition that the packets P1 and P2 are both idle sequences the transceiver device 400 can solve for the seeds of the idle sequence packet P2 and compare with the seeds of the idle sequence packet P1. In other words, after the packet P2 is transmitted to the physical coding sub-layer 405, the seed generator 405a compares the content of the seeds of the packets P1 and P2. When the seeds in the idle sequence packet P1 and the seeds in the idle sequence packet P2 are close to each other or the same, the detection unit 440 temporarily pauses adjusting the receiving parameter. When the seeds in the packet P1 and the seeds in the packet P2 are away from each other, adjusting the receiving parameter is restarted.

Figure 4D:
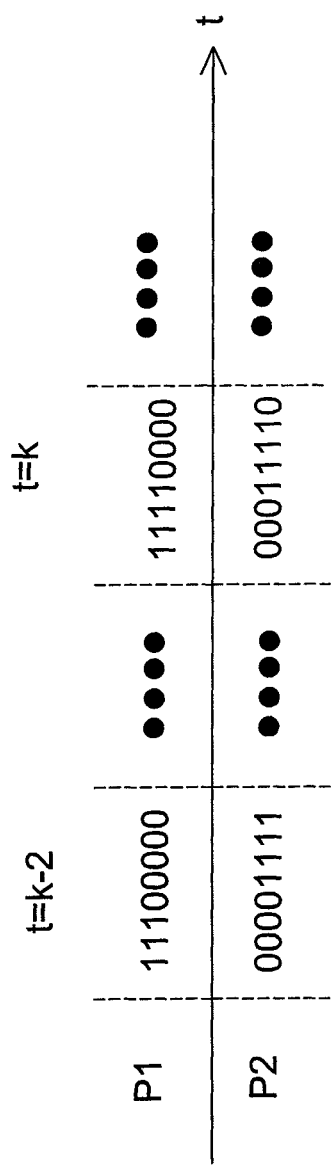
FIG. 4D shows a schematic diagram illustrating the packet P1 and the packet P2 close to each other according to one embodiment of the invention.

For example, please refer to FIGS. 4C and 4D. FIGS. 4C and 4D show schematic diagrams illustrating the packet P1 and the packet P2 close to each other according to one embodiment of the invention. Under the condition that the packets P1 and P2 are both idle sequences, in this embodiment, the seed generator 405a comprises n registers D1~Dn. At the time t=k−2, the seeds of the packet P1 are 11100000 and the seeds of the packet P2 are 00001111; and at the time t=k, the seeds of the packet P1 are 11110000 and the seeds of the packet P2 are 00011110. It is considered that the seeds in the idle sequence packet P1 and the seeds in the idle sequence packet P2 are close to each other. Thus, the detection unit 440 temporarily pauses adjusting the receiving parameter.

Figure 4F:
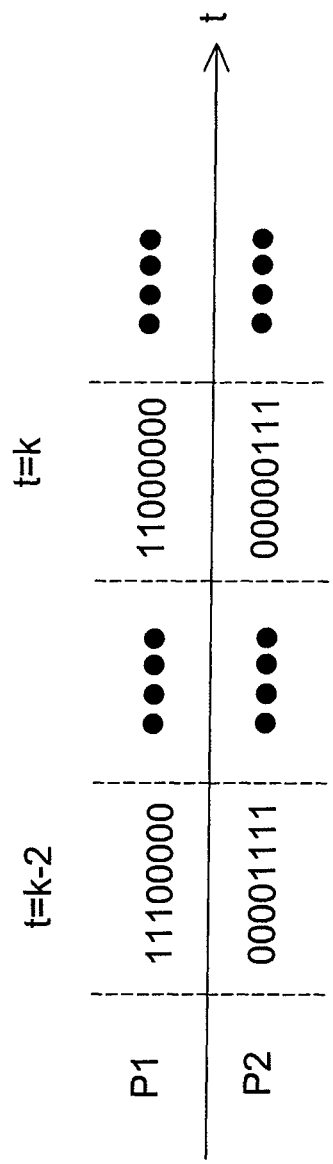
FIG. 4F shows a schematic diagram illustrating the packet P1 and the packet P2 away from each other according to one embodiment of the invention.

On the contrary, please refer to FIGS. 4E and 4F, FIGS. 4E and 4F show schematic diagrams illustrating the packet P1 and the packet P2 away from each other according to one embodiment of the invention. At the time t=k−2, the seeds of the packet P1 are 11100000 and the seeds of the packet P2 are 00001111; and at the time t=k, the seeds of the packet P1 are 11000000 and the seeds of the packet P2 are 00000111. It is considered that the seeds in the idle sequence packet P1 and the seeds in the idle sequence packet P2 are away from each other. Thus, the detection unit 440 continues adjusting the receiving parameter.

The detection unit 440 detects the packet P2 at the time k−2 and at the time k and the seed generator 405a solves the seeds of the packet P2 at the time k−2 and at the time k. The seeds of the packet P2 at the time k−2 and at the time k are compared with the seeds of the packet P1 at the time k−2 and at the time k. Therefore, the seeds of the packets P1 and P2 can be found to be either close to or away from each other or the same.

Figure 5:
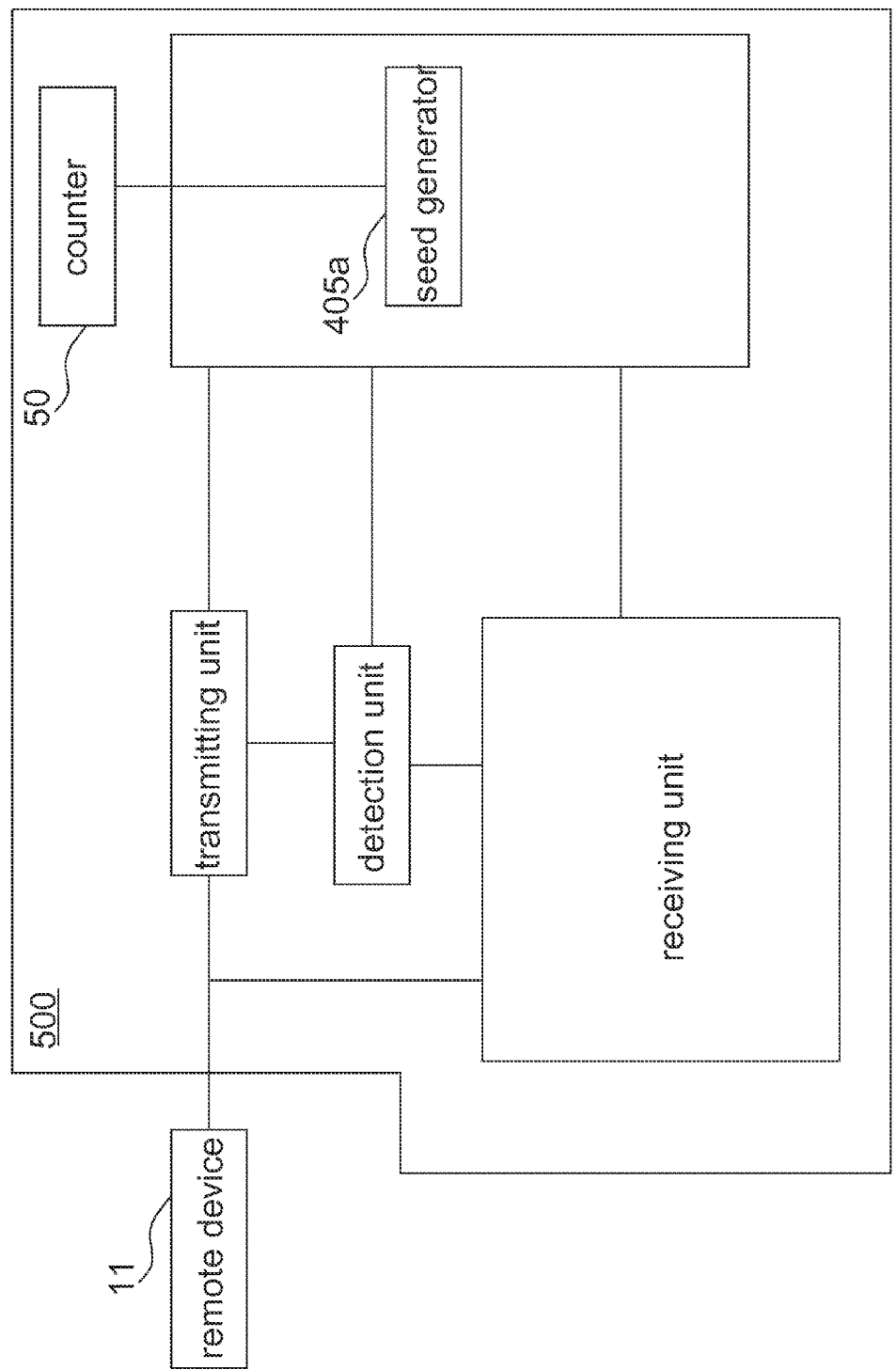
FIG. 5 shows a schematic diagram illustrating a transceiver according to one embodiment of the invention.

Please refer to FIG. 5. FIG. 5 shows a schematic diagram illustrating a transceiver 500 according to one embodiment of the invention. During initial connection, since the receiving parameter is under initialization and is not converged and the starting points of the seeds of the packet P2 is also unknown at the time, the transceiver 500 further comprises a counter 50, compared to the previous embodiments, in order to avoid the condition that the starting points of the seeds of the packets P1 and P2 are coincidentally the same that causes packet errors to result in connection failure between the transceiver 500 and the remote device 11. The counter 50 counts a counting time during initial connection of the transceiver 500. If the counting time exceeds a preset period, the seed generator 405a changes the seed. In other words, when the counting time exceeds the preset period, the shift register randomly selects a value in a register Dk among the plurality of registers D1~Dn as the starting point of the output seed.

Therefore, the transceiver 500 is forced to change the seed of the packet P1 to avoid the condition that the seeds of the packets P1 and P2 are coincidentally the same during initial connection so as to prevent the connection failure between the transceiver 500 and the remote device 11.

Figure 6:
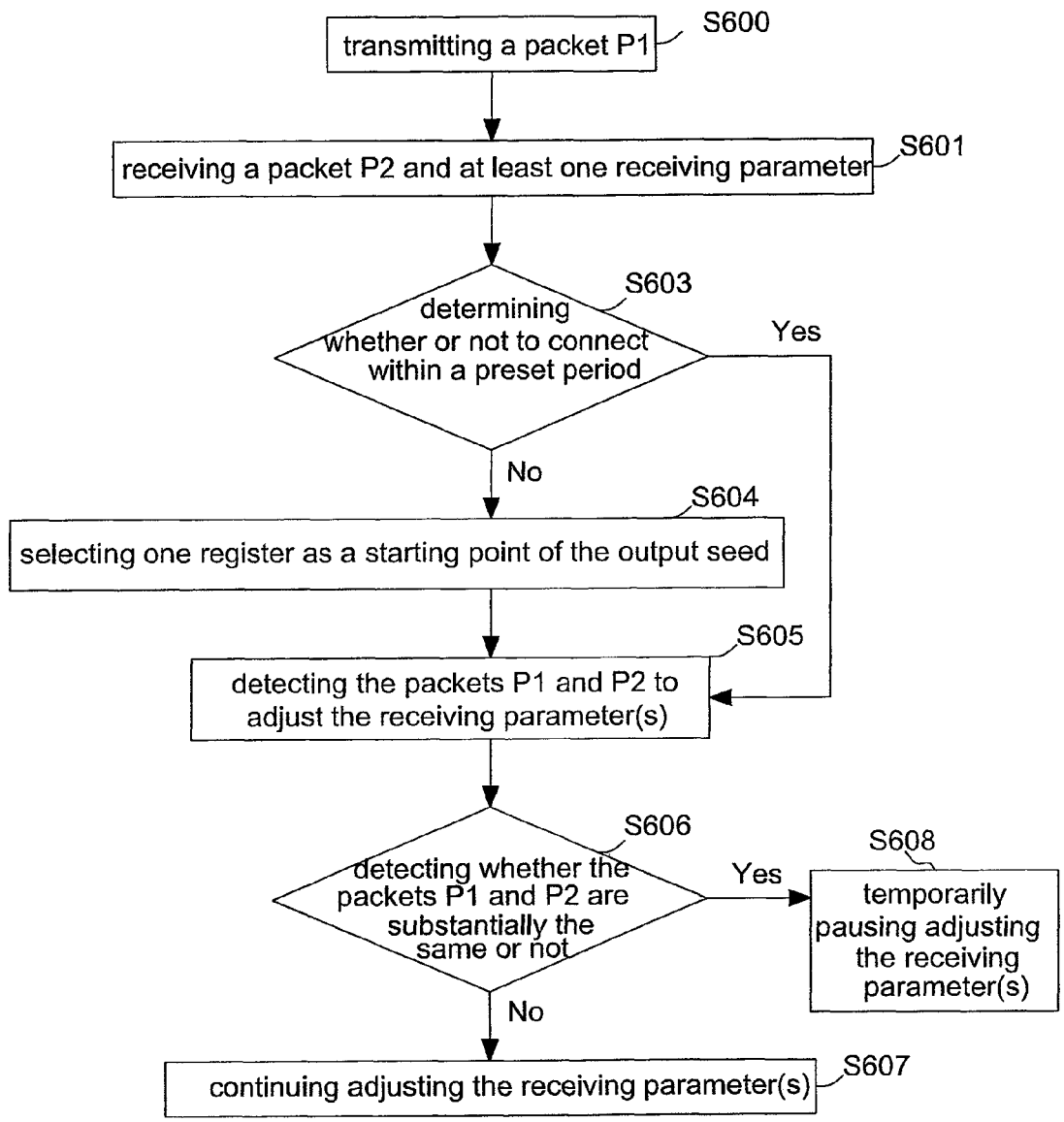
FIG. 6 shows a flow chart illustrating the parameter adjustment method according one embodiment of the invention.

Please refer to FIG. 6. FIG. 6 shows a flow chart illustrating the parameter adjustment method according one embodiment of the invention. The method comprises the following steps:

Step S600: transmitting a packet P1;

Step S601: receiving a packet P2 and at least one receiving parameter, such as parameters of the analog automatic gain control (AAGC), the digital automatic gain control (DAGC), the slicer, the feed forward equalization (FFE) and the feedback equalization (FBE).

Step S603: determining whether or not to connect within a preset period, going to step S604 if not, and going to step S605 if yes;

Step S604: selecting one register as a starting point of the output seed and going to step S605;

Step S605: detecting the packets P1 and P2 to adjust the receiving parameter(s);

Step S606: detecting whether the packets P1 and P2 are substantially the same or not, going to step S607 if not, and going to step S608 if yes;

Step S607: continuing adjusting the receiving parameter(s);

Step S608: temporarily pausing adjusting the receiving parameter(s).

In conclusion, the transceiver and the parameter adjustment method according to the invention are suitable to high definition multimedia interface (HDMI) specification and can avoid connection interruption due to packet errors when the transceiver and the remote device transmit the same signal. In other words, the problem of packet errors while transmitting and receiving are conducted in the same transmission path can be solved and the problem of connection failure between the transceiver and the remote device during initial connection can be avoided.

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A transceiver device, comprising:
   a transmitting unit, transmitting a first packet;
   a receiving unit, receiving a second packet and receiving at least one receiving parameter; and
   a detection unit, coupled to the transmitting unit and the receiving unit and detecting the first and the second packets to adjust the receiving parameter;
   wherein when the detection unit detects that the first and the second packets are substantially the same, the detection unit pause adjusting the receiving parameter;
   wherein the receiving parameter comprises at least one of an analog automatic gain control (AAGC) parameter, an analog-to-digital converter (ADC) parameter, a digital automatic gain control (DAGC) parameter, a slicer parameter, a feed forward equalization (FFE) parameter, and a feedback equalization (FBE) parameter.

2. The transceiver device according to claim 1, further comprising a packet generator, for generating a third packet and transmitting to the transmitting unit within a preset period when the first and the second packets are idle sequences wherein the third packet is used to replace the first packet.

3. The transceiver device according to claim 2, wherein the third packet is a garbage packet.

4. The transceiver device according to claim 1, wherein the detection unit calculates a signal-to-noise ratio (SNR) according to the second packet when the first and the second packets are idle sequences.

5. The transceiver device according to claim 4, wherein the detection unit temporarily pauses adjusting the receiving parameter when the signal-to-noise ratio (SNR) is larger than a preset value.

6. The transceiver device according to claim 1, further comprising a physical coding sub-layer (PCS) wherein the physical coding sub-layer further comprises a seed generator for generating a plurality of seeds in the first packet and the detection unit temporarily pauses adjusting the receiving parameter when the first and the second packets are idle sequences and the seeds in the first packet are close to or the same as a plurality of seeds in the second packet.

7. The transceiver device according to claim 6, wherein the detection unit restarts to adjust the receiving parameter when the seeds of the first and the second packets are away from each other.

8. The transceiver device according to claim 6, further comprising:
   a counter, starting to count when the transceiver device is initially connected and changing the seeds if the time of counting exceeds a preset period.

9. The transceiver device according to claim 8, wherein the seed generator is a shift register comprising a plurality of registers to generate the seeds and the shift register randomly selects one register from the plurality of registers as a starting point to output the seed.

10. A parameter adjustment method, comprising:
    transmitting a first packet;
    receiving a second packet and receiving at least one receiving parameter; and
    detecting the first packet and the second packet to adjust the receiving parameter;
    wherein adjusting the receiving parameter pauses when the first and the second packets are substantially the same;
    wherein adjusting the receiving parameter pauses when the first and the second packets are idle sequences.

11. A parameter adjustment method, comprising:
    transmitting packet;
    receiving a second packet and receiving at least one receiving parameter; and
    detecting the first packet and the second packet to adjust the receiving parameter;
    wherein adjusting the receiving parameter pauses when the first and the second packets are substantially the same;
    wherein when the first and the second packets are idle sequences, a third packet is generated within a preset period and the third packet is used to replace the first packet.

12. A parameter adjustment method, comprising:
    transmitting a first packet;
    receiving a second packet and receiving at least one receiving parameter; and
    detecting, the first packet and the second packet to adjust the receiving parameter;
    wherein adjusting the receiving parameter pauses when the first and. the second packets are substantially the same;
    wherein a signal-to-noise ratio (SNR) is calculated according to the second packet, when the first and the second packets are idle sequences.

13. The method according to claim 12, wherein adjusting the receiving parameter temporarily pauses when the signal-to-noise ratio (SNR) is larger than a preset value.

14. A parameter adjustment method, comprising:
    transmitting a first packet:
    receiving a second packet and receiving at least. one receiving parameter; and
    detecting the first packet and the second packet to adjust the receiving parameter;
    wherein adjusting the receiving parameter pauses when the first and the second packets are substantially the same;
    generating a plurality of seeds in the first packet wherein adjusting the receiving parameter temporarily pauses when the first and the second packets are idle sequences and the seeds in the first packet are close to or the same as a plurality of seeds in the second packet.

15. The method according to claim 14, wherein adjusting the receiving parameter is restarted when the seeds of the first and the second packets are away from each other.

16. The method according to claim 14, further comprising:
    counting a counting period is executed when connection starts and the seeds are changed when the counting time exceeds a preset period.

17. The method according to claim 16, further comprising:
    randomly selecting one register among a plurality of registers included in a shift register as a starting point to output the seeds by the shift register when the counting period exceeds the preset period.

* * * * *